United States Patent [19]
Takahashi et al.

[11] Patent Number: 5,883,794
[45] Date of Patent: Mar. 16, 1999

[54] HIGH VOLTAGE GENERATING CIRCUIT INCLUDING HIGH VOLTAGE CIRCUIT SECTION HAVING VOLTAGE DIVIDING RESISTOR AND SPEED-UP CAPACITOR

[75] Inventors: Haruo Takahashi, Moriyama; Nobuaki Imamura, Omihachiman; Yasuhiko Toda, Omihachiman; Yasunobu Saida, Omihachiman; Hisashi Takiguchi, Omihachiman; Masaru Omura, Moriyama, all of Japan

[73] Assignee: Murata Manufacturing Co., Ltd., Japan

[21] Appl. No.: 995,966

[22] Filed: Dec. 22, 1997

[30] Foreign Application Priority Data

Dec. 30, 1996 [JP] Japan ................................. 8-357580

[51] Int. Cl.⁶ .................................................. H02M 3/335
[52] U.S. Cl. ............................. 363/21; 313/414; 348/806
[58] Field of Search ........................... 313/414; 315/382; 348/806; 363/21

[56] References Cited

U.S. PATENT DOCUMENTS

5,705,900  1/1998  Hwang ..................................... 315/382

*Primary Examiner*—Shawn Riley
*Attorney, Agent, or Firm*—Ostrolenk, Faber, Gerb, & Soffen, LLP

[57] ABSTRACT

A high-voltage generating circuit includes a high-voltage production circuit, a high-voltage detecting circuit and a control circuit. The high-voltage production circuit includes clamping diodes to provide a good response for stabilizing a high voltage. The control circuit applies pulse-width control to a power source voltage. The high-voltage detecting circuit has a high-voltage circuit section to which a voltage of 1 kV to several tens of kilovolts is applied and a low-voltage circuit section to which a voltage of several tens of volts is applied. The high-voltage circuit section comprises a parallel circuit including voltage-dividing resistors and a speed-up capacitor. The speed-up capacitor is set to 1000 pF or less.

7 Claims, 6 Drawing Sheets

FIG. 4(a) Flyback pulse

FIG. 4(b) Primary coil current

FIG. 4(c) Drive signal

FIG. 4(d) Ramp signal

FIG. 4(e) HD signal

HIGH VOLTAGE GENERATING CIRCUIT INCLUDING HIGH VOLTAGE CIRCUIT SECTION HAVING VOLTAGE DIVIDING RESISTOR AND SPEED-UP CAPACITOR

BACKGROUND OF THE INVENTION

1. Field of the Invention

The present invention relates to high-voltage generating circuits, and more particularly, to a high-voltage generating circuit for generating a high voltage applied to the anode of a cathode-ray tube (CRT).

2. Description of the Related Art

Figure 10:
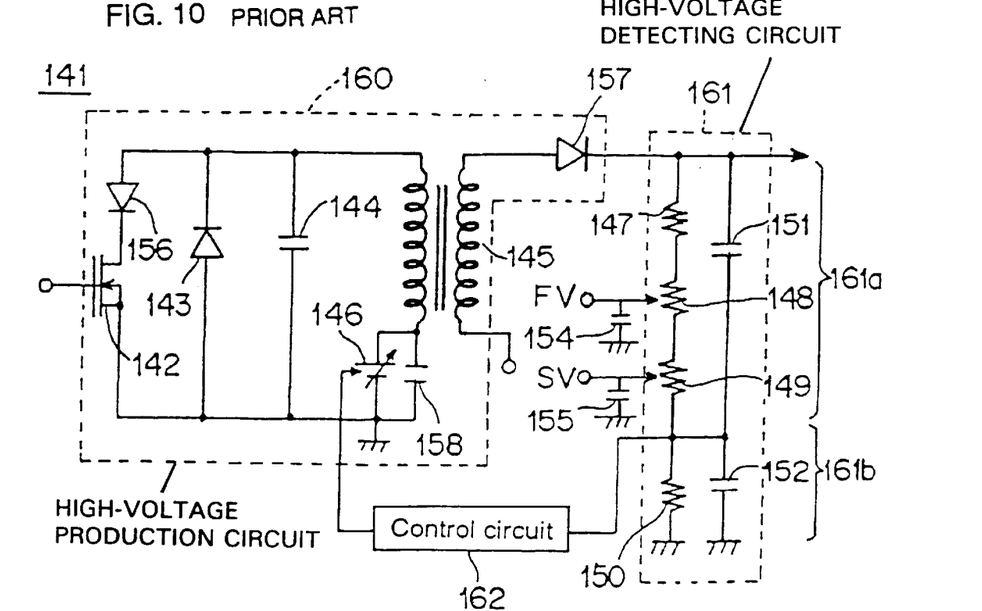
FIG. 10 is a circuit diagram of a conventional high-voltage generating circuit.

A high-voltage generating circuit shown in FIG. 10 is conventionally known. This high-voltage generating circuit 141 roughly includes a high-voltage production circuit 160, a high-voltage detecting circuit 161, and a control circuit 162. The high-voltage detecting circuit 161 detects a fluctuation of a high voltage output from the high-voltage production circuit 160. The control circuit 162 controls a variable DC power source 146 according to a detection voltage output from the high-voltage detecting circuit 161 to compensate the high voltage output from the high-voltage production circuit 160 for its fluctuation and to make the high voltage stable.

The high-voltage production circuit 160 is formed of a switching device 142, a damping diode 143, a resonant capacitor 144, a flyback transformer 145, the variable driving power source 146, a smoothing capacitor 158, and rectifying diodes 156 and 157.

The high-voltage detecting circuit 161 includes voltage-dividing resistors 147, 148, 149, and 150 for dividing the high voltage output from the high-voltage production circuit 160, and speed-up capacitors 151 and 152 for increasing the rise speed of the high voltage output from the high-voltage production circuit 160. voltage-dividing resistors 147, 148, and 149 are connected in series, and together with the speed-up capacitor 151 form a parallel circuit serving as a high-voltage circuit section 161a. The voltage-dividing resistor 150 and the speed-up capacitor 152 form a parallel circuit serving as a low-voltage circuit section 161b. The voltage-dividing resistor 148 also serves as a focus resistor, and the voltage-dividing resistor 149 also serves as a screen resistor. There are also shown a focus capacitor 154 and a screen capacitor 155. The high-voltage generating circuit 141 is of a so-called +B control type. The control circuit 162 controls the voltage of the power source, and the voltage is smoothed by the smoothing capacitor 158 and supplied to the flyback transformer 145.

Figure 11:
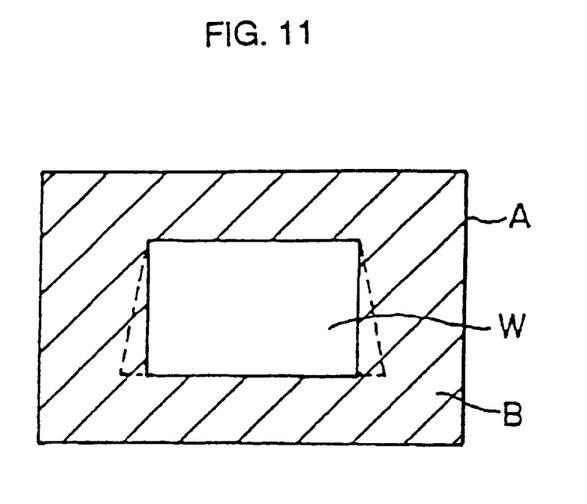
FIG. 11 is a view of the screen of a cathode-ray tube.

A cathode-ray tube (CRT) generally has a capacitance of several hundreds to several thousands of picofarads. When a screen A of the cathode-ray tube has a white portion W having a high luminance level (hatched portion B is black) as shown in FIG. 11, a large beam current flows at the white portion W in the cathode-ray tube and a high voltage cannot quickly be generated if the high voltage drops. As a result, the contour of the white portion W on the screen is distorted as shown by dotted lines, which is called a trapezoidal distortion, and the image quality deteriorates.

It has been proposed as a countermeasure to use a capacitor having a capacitance of as large as about 1500 to 3000 pF for the speed-up capacitor 151 of the high-voltage generating circuit 141. However, in that case, the rise speed of the high voltage decreases and it is necessary to extend the blanking period so as not to clearly show a change on the screen until the high voltage rises. Alternatively, a smoothing capacitor having a large capacitance may be provided in addition to the speed-up capacitor 151. In this case, since a high voltage of 1 kV to several tens of kilovolts output from the high-voltage production circuit 160 is applied to this smoothing capacitor, it must satisfy a high dielectric voltage specification and is expensive and large. Therefore, the high-voltage generating circuit becomes large and expensive.

SUMMARY OF THE INVENTION

Accordingly, it is an object of the present invention to provide a high-voltage generating circuit in which a speed-up capacitor in a high-voltage circuit section can be made compact and the high voltage output rises quickly.

According to the invention, the high-voltage generating circuit includes: a high-voltage production circuit for accumulating electric energy supplied from a power source in an LC resonant circuit during a transistor period and for converting the electric energy accumulated in the LC resonant circuit to a high voltage during a flyback period determined by the resonant frequency of the LC resonant circuit; a high-voltage detecting circuit including a high-voltage circuit section formed of a parallel circuit having a high-dividing resistor and a speed-up capacitor with a capacitance of 1000 pF or less, and a low-voltage circuit section which is connected in series to the high-voltage circuit section and which has a parallel circuit formed of a voltage-dividing resistor and a speed-up capacitor, the high-voltage detecting circuit dividing the high voltage output from the high-voltage production circuit by the voltage-dividing resistors into a lower voltage and detecting it; and a control circuit for controlling the high voltage according to the voltage output from the high-voltage detecting circuit, the control circuit applying one of: pulse-width control to a power source voltage of the high-voltage production circuit and pulse-width control to an output transistor of the high-voltage production circuit.

With the structure described above, since the control circuit applies pulse-width control to the power source voltage of the high-voltage production circuit, the high voltage is stabilized at a high speed with a good response, and image distortion is suppressed to a level where no practical problem occurs. In addition, since the capacitance of the speed-up capacitor in the high-voltage circuit section of the high-voltage detecting circuit is set to as small as 1000 pF or less, the capacitor is made compact and the rise time of the high voltage is greatly reduced.

The high-voltage generating circuit may be configured such that it further includes a double-focus circuit for outputting a dynamic-focus voltage and a static-focus voltage, the ground point of a series circuit formed of a variable resistor for dynamic focus and a variable resistor for a screen in the double-focus circuit is separated from the ground point of a variable resistor for static focus in the double-focus circuit, and at least one voltage-dividing resistor in the high-voltage circuit section of the high-voltage detecting circuit serves as the variable resistor for static focus. With the structure described above, since the current flowing through the variable resistor for static focus is unlikely to leak out from the capacitor for the screen, the capacitance of the speed-up capacitor in the high-voltage circuit section can be made small and the rise time of the high voltage can be reduced.

In the high-voltage generating circuit, a capacitor for static focus in the double-focus circuit may be connected to a high-voltage detection point in the high-voltage detecting circuit. The current leaked out from the capacitor for static focus can be again used for high-voltage detection. Therefore, the capacitance of the speed-up capacitor in the high-voltage circuit section can be made small.

The foregoing object is achieved in another aspect of the present invention through the provision of a high-voltage generating circuit including: a high-voltage production circuit for accumulating electric energy smoothed by a smoothing capacitor and supplied from a power source in an LC resonant circuit during a transistor period and for converting the electric energy accumulated in the LC resonant circuit to a high voltage during a flyback period determined by the resonant frequency of the LC resonant circuit; a high-voltage detecting circuit including a high-voltage circuit section formed of a parallel circuit having a high-dividing resistor and a speed-up capacitor with a capacitance of 1000 pF or less, and a low-voltage circuit section which is connected in series to the high-voltage circuit section and which has a parallel circuit formed of a voltage-dividing resistor and a speed-up capacitor, the high-voltage detecting circuit dividing the high voltage output from the high-voltage production circuit by the voltage-dividing resistors into a lower voltage and detecting it; a control circuit for controlling the voltage of the power source of the high-voltage production circuit to control the high voltage, according to the voltage output from the high-voltage detecting circuit; and a double-focus circuit for outputting a dynamic-focus voltage and a static-focus voltage, wherein the ground point of a series circuit formed of a variable resistor for dynamic focus and a variable resistor for a screen in the double-focus circuit is separated from the ground point of a variable resistor for static focus in the double-focus circuit, at least one of the high-dividing resistors in the high-voltage circuit section of the high-voltage detecting circuit serving as the variable resistor for static focus, and a capacitor for static focus in the double-focus circuit being connected to a high-voltage detection point in the high-voltage detecting circuit.

With the structure described above, image distortion can be suppressed to a level where no practical problem occurs. Therefore, the capacitance of the speed-up capacitor in the high-voltage circuit section of the high-voltage detecting circuit can be made small.

Other features and advantages of the present invention will become apparent from the following description of the invention which refers to the accompanying drawings.

BRIEF DESCRIPTION OF THE DRAWINGS

FIGS. 4(a) to 4(e) is a timing chart of the high-voltage generating circuit shown in FIG. 1.

DETAILED DESCRIPTION OF EMBODIMENTS OF THE INVENTION

High-voltage generating circuits according to embodiments of the present invention will be described below by referring to the accompanying drawings. In each embodiment, the same symbols are assigned to the same components or the same portions.

First Embodiment

Figure 1:
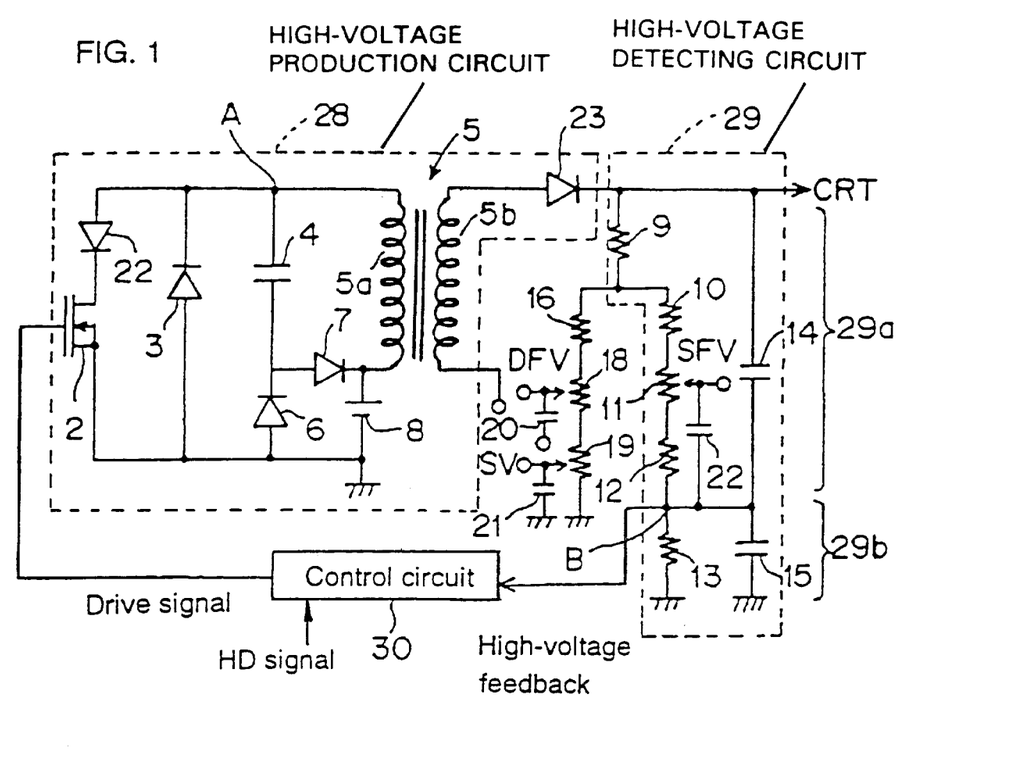
FIG. 1 is a circuit diagram of a high-voltage generating circuit according to a first embodiment of the present invention.

In a first embodiment, a so-called double-focus high-voltage generating circuit which outputs two kinds of focus voltages will be described. As shown in FIG. 1, a high-voltage generating circuit 1 includes a high-voltage production circuit 28, a high-voltage detecting circuit 29, and a control circuit 30. The high-voltage detecting circuit 29 detects a fluctuation of a high voltage output from the high-voltage production circuit 28. The control circuit 30 compensates the high voltage output from the high-voltage production circuit 28 for its fluctuation according to a voltage output from the high-voltage detecting circuit 29 to make the high voltage stable.

The high-voltage production circuit 28 is formed of a switching device 2 serving as an output transistor, a damping diode 3, a resonant capacitor 4, a flyback transformer 5, clamping diodes 6 and 7, a driving power source 8, and rectifying diodes 22 and 23. Specifically, one end (a winding-start end, for example) of a primary coil 5a of the flyback transformer 5 is connected to the driving power source 8, and the other end (a winding-termination end) of the primary coil 5a is connected to the drain of a MOS field effect transistor (FET) 2 serving as the switching device through the rectifying diode 22. The source of the MOS FET 2 is connected to the ground. The damping diode 3 is connected in parallel to the MOS FET 2 with its forward direction disposed opposite the current direction of the MOS FET 2. The winding-termination end of the primary coil 5a is connected to one end of the resonant capacitor 4, and the other end of the resonant capacitor 4 is connected to the cathode of the clamping diode 6. The anode of the clamping diode 6 is connected to the ground. The connection point between the clamping diode 6 and the resonant capacitor 4 is connected to the anode of the clamping diode 7, and the cathode of the clamping diode 7 is connected to the connection point between the primary coil 5a and the driving power source 8.

The high-voltage detecting circuit 29 includes a high-voltage circuit section 29a formed of a parallel circuit including voltage-dividing resistors 9, 10, 11, and 12 and a speed-up capacitor 14, and a low-voltage circuit section 29b formed of a parallel circuit including a voltage-dividing resistor 13 and a speed-up capacitor 15. The high-voltage circuit section 29a is connected in series to a low-voltage circuit section 29b. Most of a high voltage (1 kV to several tens of kilovolts) output from the high-voltage production circuit 28 is applied to the high-voltage circuit section 29a and the remaining voltage (several tens of volts) is applied to the low-voltage circuit section 29b. The connection point B between the high-voltage circuit section 29a and the low-voltage circuit section 29b serves as a high-voltage detection point, and the voltage at this point B is fed back to the control circuit 30. The high-voltage detecting circuit 29 is connected to the high-voltage end of a secondary coil 5b of the flyback transformer 5 through the rectifying diode 23. A high voltage output from the high-voltage production circuit 28 is divided by the voltage-dividing resistors 9 to 13 connected in series and detected as a lower voltage.

The high-voltage generating circuit 1 is of a double-focus type, and includes a variable resistor 18 and a capacitor 20 for dynamic focus, a variable resistor 19 and a capacitor 21 for a screen, and a variable resistor and a capacitor 22 for static focus. The voltage-dividing resistor 11 in the high-voltage detecting circuit 29 also serves as the variable resistor for static focus and the number of components used is reduced. The variable resistor 18 for dynamic focus, the variable resistor 19 for the screen, and the variable resistor 10 for static focus are a resistor for outputting a dynamic focus voltage, a resistor for outputting a screen voltage, and a resistor for outputting a static focus voltage, respectively. The capacitor 22 for static focus and the capacitor 21 for the screen serve as noise filters to stabilize each voltage. The capacitor 20 for dynamic focus removes a DC component to stabilize a dynamic focus voltage.

The ground point of a series circuit formed of the variable resistor 18 for dynamic focus and the variable resistor 19 for the screen is electrically separated from the ground point of the variable resistor 10 for static focus. Since usually in a double-focus type the capacitor 20 for dynamic focus is set to about 500 pF, the capacitor 22 for static focus is set to about 220 pF, and the capacitor 21 for the screen is set to about 1000 to 3000 pF in a double-focus type, if the ground point of the variable resistor 18 for dynamic focus and that of the variable resistor 10 for static focus are not separated but connected, a current flowing through the variable resistor 10 for static focus is likely to leak out from the capacitor 21 for the screen, and the capacitance of the speed-up capacitor 14 cannot be reduced. In this embodiment, however, since the ground point of the series circuit formed of the variable resistor 18 for dynamic focus and the variable resistor 19 for the screen is separated from the ground point of the variable resistor 10 for static focus, the current flowing through the variable resistor 10 for static focus is unlikely to leak out from the capacitor 21 for the screen, and the capacitance of the speed-up capacitor 14 can be reduced.

In addition, since one end of the capacitor 22 for static focus is electrically connected to the connection point B serving as a high-voltage detection point, a current leaking out through the capacitor 22 for static focus can be used again for high-voltage detection. Therefore, the capacitance of the speed-up capacitor 14 can be made further small.

Figure 2:
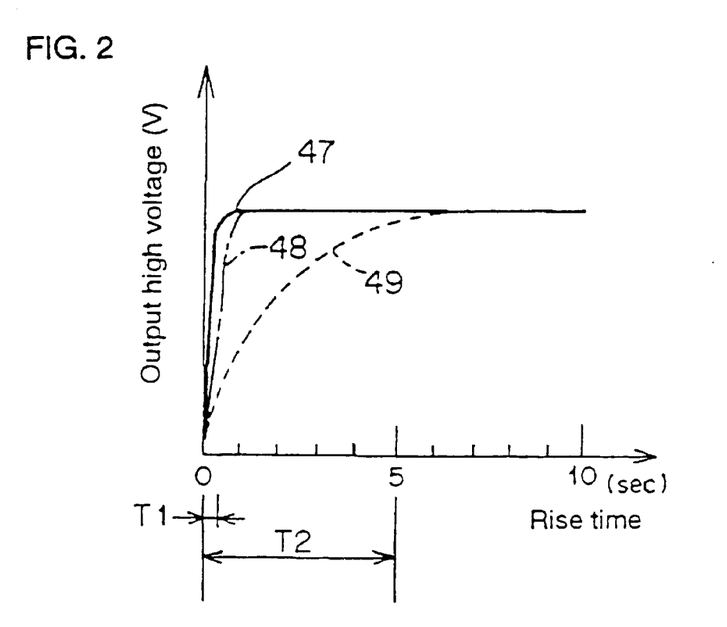
FIG. 2 is a graph indicating the rise time of the high voltage output from the high-voltage generating circuit shown in FIG. 1.

The high-voltage generating circuit 1 of the first embodiment employs a pulse width control method (a method in which a +B voltage is pulse-width controlled and applied to the primary circuit of a flyback transformer without being smoothed by a capacitor having a large capacitance) to increase response for stabilizing a high voltage as described later and the speed-up capacitor 14 of the high-voltage circuit section 29a need not have a large capacitance. Specifically, the speed-up capacitor 14 is set to about 10 pF and the speed-up capacitor 15 is set to about 0.1 µF. With these settings, the rise time of a high output voltage can be set to as short as about 0.2 seconds as shown by a solid line 47 in FIG. 2. FIG. 2 also shows the rise time of a high output voltage in the conventional high-voltage generating circuit 141 shown in FIG. 10, by a dotted line 49. Therefore, the blanking period T1 of the high-voltage generating circuit 1 according to the first embodiment can be set to an extremely short time as compared with the blanking period T2 of the conventional high-voltage generating circuit 141.

Figure 3:
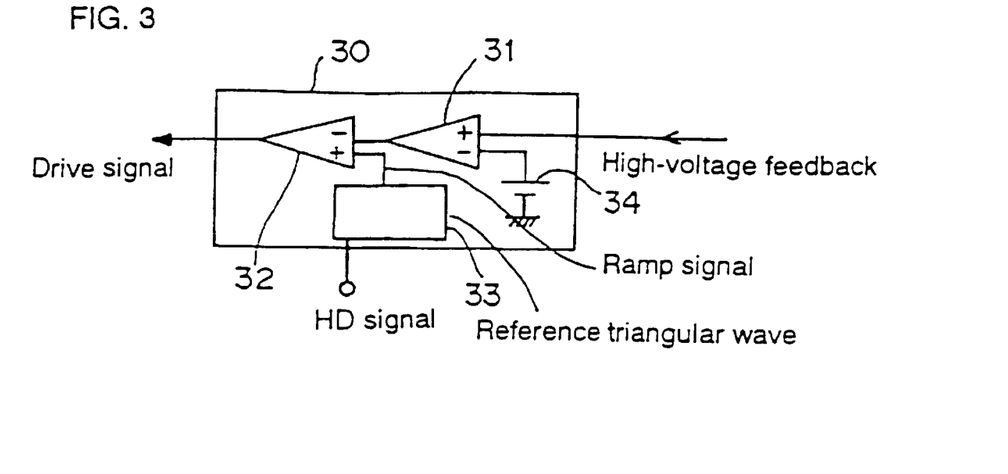
FIG. 3 is a circuit diagram of a control circuit shown in FIG. 1.

As shown in FIG. 3, the control circuit 30 includes an operational amplifier 31, a comparator 32, a reference triangular wave shaping circuit 33, and a reference power source 34. The detection voltage of the high-voltage detecting circuit 29 is input to the non-inverting input terminal of the operational amplifier 31. A reference voltage output from the reference power source 34 is input to the inverting input terminal of the operational amplifier 31. The operational amplifier 31 compares the detection voltage with the reference voltage and outputs the signal corresponding to a reduction of a high output voltage to the inverting input terminal of the comparator 32. A signal output from the reference triangular wave shaping circuit 33 is input to the non-inverting input terminal of the comparator 32.

The operation for stabilizing the high voltage in the high-voltage generating circuit 1 will be described below by referring to a timing chart shown in FIG. 4.

Figures 4A, 4E:
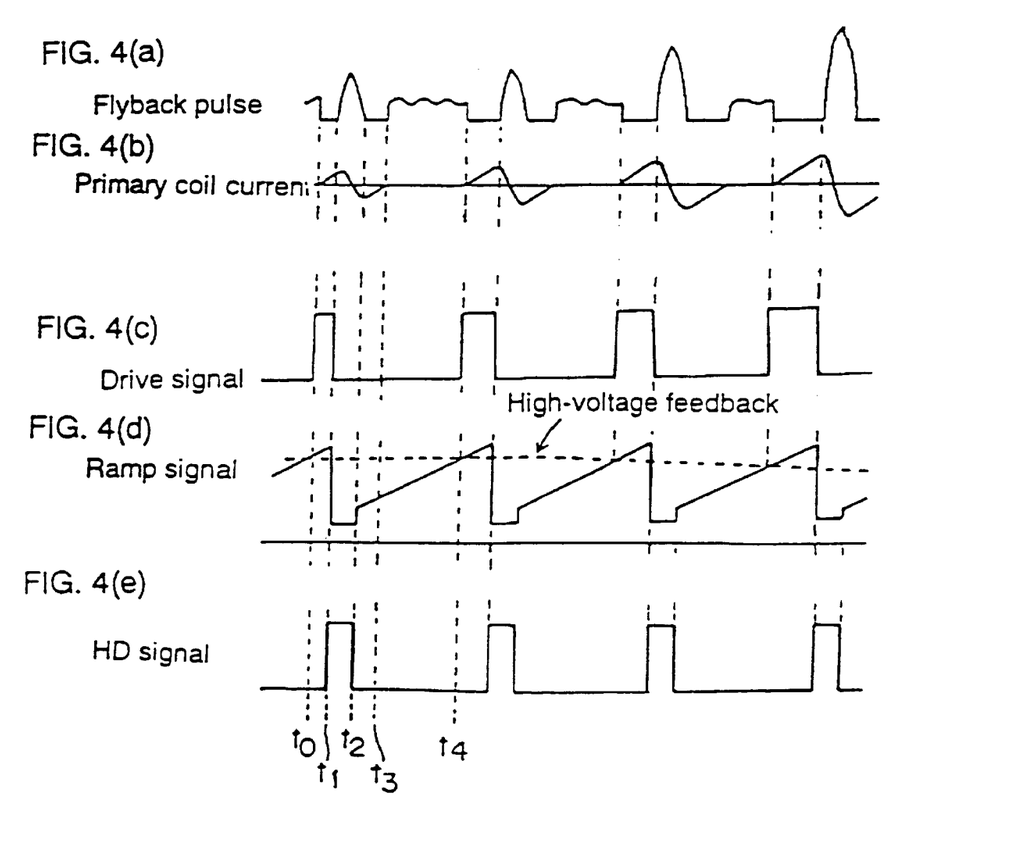

The reference triangular wave shaping circuit 33 integrates a horizontal drive signal (hereinafter called an HD signal) synchronized with a horizontal deflection output circuit (not shown) and shown in FIG. 4(e) to generate a ramp signal shown in FIG. 4(d) and applies the ramp signal to the non-inverting input terminal of the comparator 32. The comparator 32 compares the ramp signal with the signal from the operational amplifier 31 and generates a drive signal (FIG. 4(c)) which rises at a point where the outputs of the operational amplifier and the ramp signal have the same voltage and falls at a point where the ramp signal falls, that is, the HD signal rises, as shown in FIGS. 4(d) and 4(c). When the high output voltage decreases, the output of the operational amplifier 31 decreases. As a result, the pulse width of the drive signal increases. See FIG. 4(c). The comparator 32 generates a drive signal which has a wider pulse width as the high output voltage decreases and applies it to the MOS FET 2. Conversely, when the high output voltage increases, the output of the operational amplifier 31 increases. As a result, the pulse width of the drive signal decreases. See FIG. 4(c). The MOS FET 2 switches according to the ON pulse width of the drive signal.

When the MOS FET 2 goes on at $t_0$ as shown in FIG. 4(c), a current flows from the driving power source 8 through the primary coil 5a and the MOS FET 2 to ground. The current flowing through the primary coil 5a increases with time as shown in FIG. 4(b) and electromagnetic energy is accumulated in the primary coil 5a by this current flow. The period while the MOS FET 2 is on is called a transistor period.

When the MOS FET 2 goes off at $t_1$, a current flows from the primary coil 5a through the resonant capacitor 4 and the clamping diode 7. LC series resonance starts with the inductance of the primary coil 5a and the capacitance of the resonant capacitor 4, and a flyback pulse (voltage pulse) shown in FIG. 4(a) is generated. The period from $(t_1)$ when the flyback pulse is generated to $(t_2)$ when it finishes is called a flyback period. The flyback pulse becomes maximum when all electromagnetic energy at the primary coil 5a is converted to the electrostatic energy of the resonant capacitor 4. After all electromagnetic energy at the primary coil 5a is converted to the electrostatic energy of the resonant capacitor 4, a reverse current flows from the clamping diode 6 through the resonant capacitor 4 and the primary coil 5a to the driving power source 8. The electrostatic energy of the resonant capacitor 4 is reversely converted to the electromagnetic energy of the primary coil 5a.

When the flyback pulse finishes at $t_2$, the voltage at point A in the circuit shown in FIG. 1 becomes zero. The damping diode 3 is turned on and a current flows from the ground through the damping diode 3 to the primary coil 5a. With this current flow, the voltage at point A increases. When the voltage becomes equal to the voltage E of the driving power source 8, the damping diode 3 is turned off. The period ($t_2$–$t_3$) while the damping diode 3 is on is hereinafter called a damping period.

When the MOS FET 2 is turned on at $t_4$, point A is grounded and a current flowing from the driving power source 8 to the primary coil 5a flows through the MOS FET 2 to the ground. The circuit condition matches that at $t_0$. The operations from $t_0$ to $t_4$ are repeated to continue the circuit operation. The flyback pulse generated at the primary coil 5a is stepped up in the flyback transformer 5 and applied to the anode of the cathode-ray tube through the rectifying diode 23.

As described above, unlike a high-voltage generating circuit employing the conventional +B control method (a method in which a power voltage is smoothed and then applied to the primary winding of a flyback transformer), since the high-voltage generating circuit 1 employs the pulse-width control method (a method in which a +B voltage is pulse-width controlled and applied to the primary winding of a flyback transformer without smoothing by a large-capacitance capacitor) to directly control the pulse width of a driving signal, it provides a good response for stabilizing the high voltage. As a result, although the flyback transformer 5 employs a peak rectifying method, the high output voltage is compensated for its fluctuation without a delay and stabilized at a high speed. Therefore, the speed-up capacitor 14 of the high-voltage circuit section 29a in the high-voltage detecting circuit 29 need not have a large capacitance.

Since this high-voltage generating circuit 1 provides a good response for stabilizing the high voltage, when used for a cathode-ray tube which has been used at a high frequency, image distortion can be suppressed to a level where the distortion is almost negligible, merely by the use of a capacitance of several hundreds to several thousands of picofarads which a cathode-ray tube usually has, even for a ripple component. For example, when it is assumed that a cathode-ray tube has a capacitance of 1000 pF and a beam current of 2 mA flows in the cathode-ray tube, if the frequency of the scanning line of the cathode-ray tube is 15.75 kHz, a horizontal ripple $\Delta V$ is expressed as follows:

$$\Delta V=(2\ mA\times64\ \mu s)/1000\ pF=128\ V.$$

When the frequency of the scanning line increases to 32 kHz, the horizontal ripple is expressed as follows:

$$\Delta V=(2\ mA\times32\ \mu s)/1000\ pF=64\ V.$$

This means that image distortion is almost negligible merely through the use of the capacitance of the cathode-ray tube. Therefore, the speed-up capacitor 14 of the high-voltage circuit section 29a in the high-voltage detecting circuit 29 need not have a large capacitance in order to eliminate image distortion.

Since the speed-up capacitor 14 has a small capacitance, a ceramic capacitor, which is made compact more easily than a conventionally used film capacitor, can be used for it, and it can be further made compact.

Second Embodiment

Figure 5:
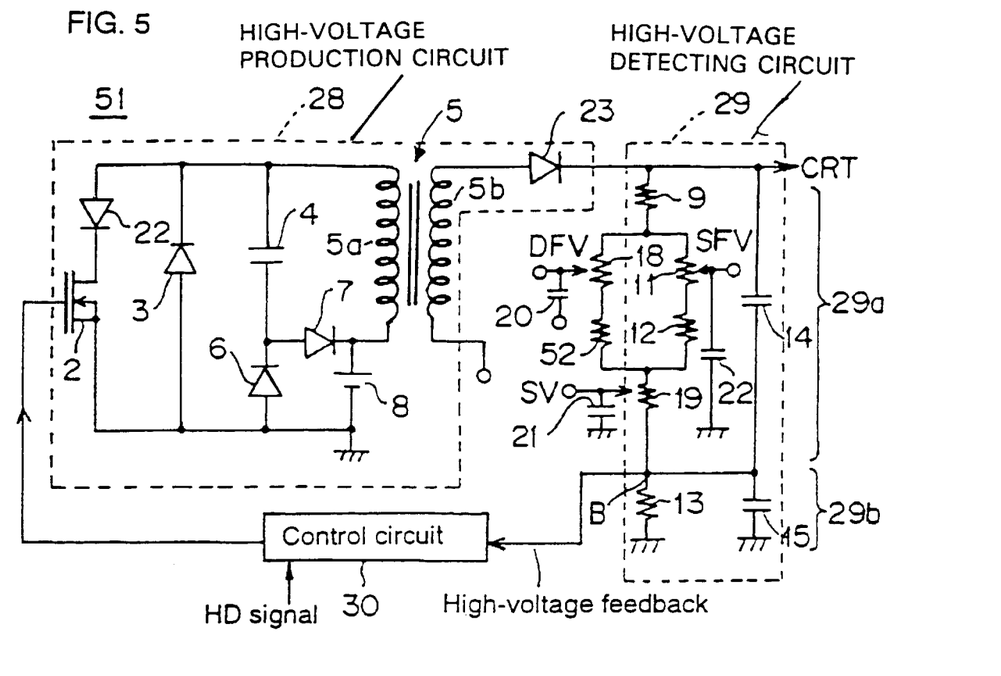
FIG. 5 is a circuit diagram of a high-voltage generating circuit according to a second embodiment of the present invention.

In a second embodiment, as shown in FIG. 5, a high-voltage generating circuit 51 employing a pulse width control method will be described. The high-voltage generating circuit 51 is of a so-called double focus type, in which the ground side of a variable resistor 18 for dynamic focus is electrically connected to the ground side of a variable resistor 11 for static focus and they are grounded through a variable resistor 19 for a screen.

A high-voltage detecting circuit 29 has a high-voltage circuit section 29a and a low-voltage circuit section 29b. The high-voltage circuit section 29a is formed of a parallel circuit including voltage-dividing resistors 9, 11, and 12, the variable resistor 19 for the screen, and a speed-up capacitor 14. The low-voltage circuit section 29b is formed of a parallel circuit including a voltage-dividing resistor 13 and a speed-up capacitor 15. Most of a high voltage (1 kV to several tens of kilovolts) output from the high-voltage production circuit 28 is applied to the high-voltage circuit section 29a and the remaining voltage (several tens of volts) is applied to the low-voltage circuit section 29b.

The voltage-dividing resistor 11 in the high-voltage detecting circuit 29 also serves as the variable resistor for static focus, and the variable resistor 19 for the screen also serves as a voltage-dividing resistor in the high-voltage detecting circuit 29. The number of components used is reduced in this way. One end of the capacitor 22 for static focus is grounded. There is also shown in the figure a resistor 52 for balance.

The high-voltage generating circuit 51 employs the pulse width control method to increase response for stabilizing the high voltage and the speed-up capacitor 14 of the high-voltage circuit section 29a need not have a large capacitance. Specifically, the speed-up capacitor 14 can be set to as small as about 200 to 600 pF and the speed-up capacitor 15 is set to about 0.1 $\mu$F. With these settings, the rise time of a high output voltage is set to as short as about 1 second as shown by a one-dot chain line 48 in FIG. 2.

Since usually the capacitor 21 for the screen is set to as large as about 1000 to 3000 pF in a double-focus type, a current flowing through the variable resistor 11 for static focus is likely to leak out from the capacitor 21 for the screen, and the capacitance of the speed-up capacitor 14 cannot be reduced. When a resistor is connected in series with the capacitor 21 for the screen, the capacitance of the capacitor 21 for the screen can be set to about 300 pF and the capacitance of the speed-up capacitor 14 may be further reduced. Alternatively, as in the high-voltage generating circuit 1 in the first embodiment, the high-voltage generating circuit may be configured such that one end of the capacitor 22 for static focus is not grounded but electrically connected to the connection point B serving as a high-voltage detection point to further reduce the capacitance of the speed-up capacitor 14.

Third Embodiment

Figure 6:
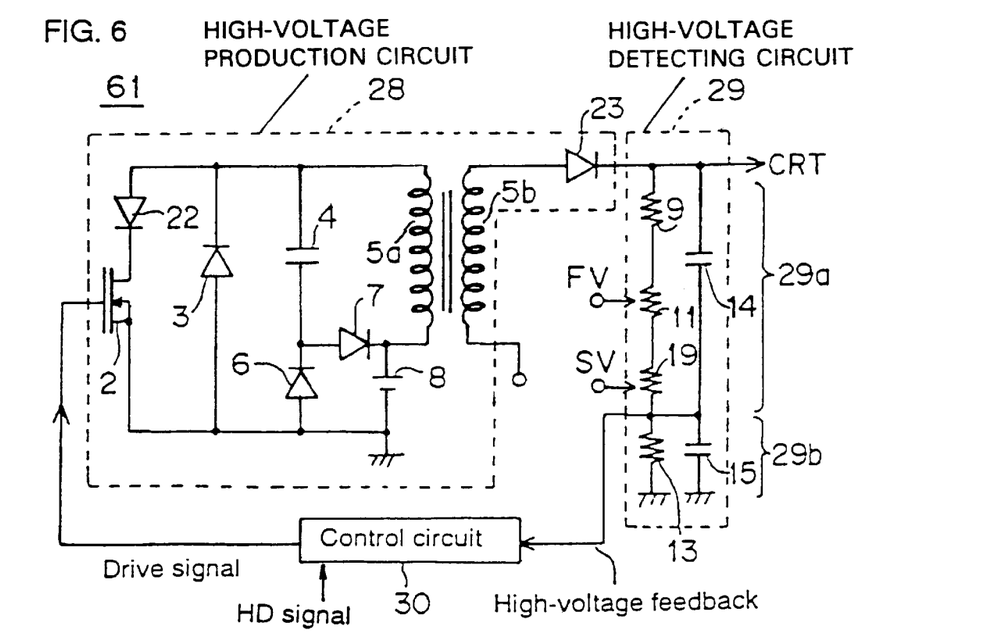
FIG. 6 is a circuit diagram of a high-voltage generating circuit according to a third embodiment of the present invention.

In a third embodiment, as shown in FIG. 6, a so-called single-focus high-voltage generating circuit 61 which employs a pulse width control method and which outputs one type of focus voltage will be described below. A high-voltage detecting circuit 29 has a high-voltage circuit section 29a formed of a parallel circuit including voltage-dividing resistors 9 and 11, a variable resistor 19 for a screen, and a speed-up capacitor 14, and a low-voltage circuit section 29b formed of a parallel circuit including a voltage-dividing resistor 13 and a speed-up capacitor 15.

The high-voltage generating circuit 61 is of a single focus type and includes the variable resistor 19 for the screen and a variable resistor for focus. The variable resistor 19 for the screen also serves as a voltage-dividing resistor in the high-voltage detecting circuit 29, and the variable resistor for focus also serves as the voltage-dividing resistor 11 in the high-voltage detecting circuit 29. The number of components used is reduced in this way.

The high-voltage generating circuit 61 employs the pulse width control method. As described in the first embodiment, since the pulse width of the drive signal is controlled to directly pulse-width control the switching device 2, the circuit has a good response for stabilizing the high voltage and the speed-up capacitor 14 of the high-voltage circuit section 29a need not have a large capacitance. Specifically, the speed-up capacitor 14 can be set to as small as about 20 pF. This means that the capacitor can be made compact. The speed-up capacitor 15 is set to about 0.1 $\mu F$.

Fourth Embodiment

Figure 7:
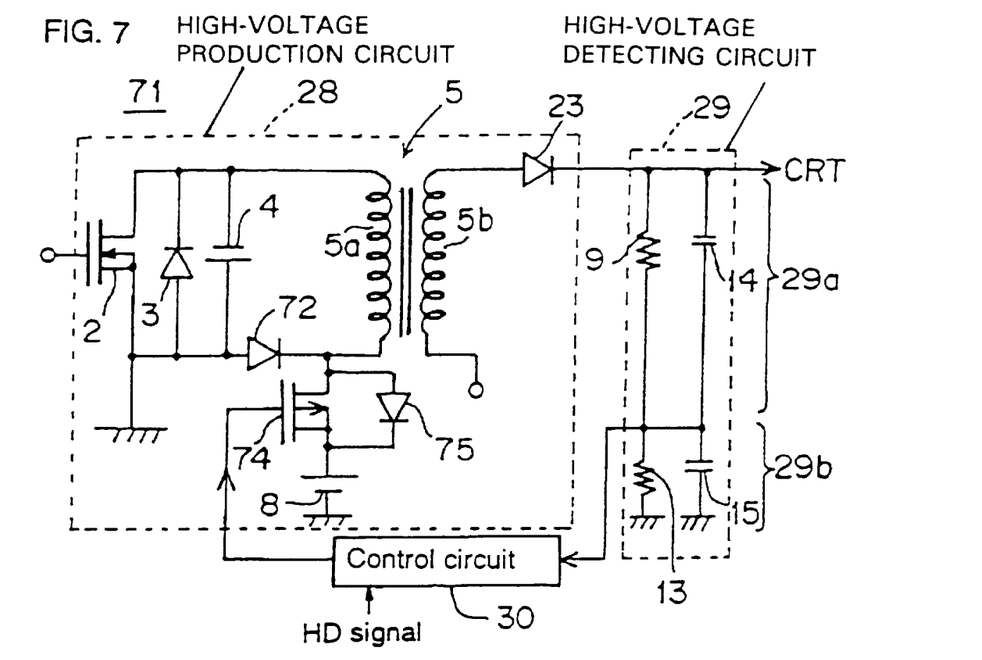
FIG. 7 is a circuit diagram of a high-voltage generating circuit according to a fourth embodiment of the present invention.

In a fourth embodiment, as shown in FIG. 7, a high-voltage generating circuit 71 employing a pulse width control method will be described. A high-voltage production circuit 28 is formed of a switching device 2, a damping diode 3, a resonant capacitor 4, a flyback transformer 5, a driving power source 8, a switching device 74 for control, a damping diode 75 for control, and rectifying diodes 23 and 72. One end of the primary coil 5a of the flyback transformer 5 is connected to the drain of the MOS FET 74 serving as a switching device, and the source of the MOS FET 74 is connected to the ground through the driving power source 8. The damping diode 75 is connected in parallel to the MOS FET 74 with its forward direction set opposite the current direction of the MOS FET 74.

A high-voltage detecting circuit 29 is formed of a high-voltage circuit section 29a including a voltage-dividing resistor 9 and a speed-up capacitor 14, and a low-voltage circuit section 29b including a voltage-dividing resistor 13 and a speed-up capacitor 15. The voltage-dividing resistor 9 forms a parallel circuit together with the speed-up capacitor 14. The high-dividing resistor 13 forms a parallel circuit together with the speed-up capacitor 15. These two parallel circuits are connected in series to form a multiple-stage circuit.

The high voltage output from the high-voltage production circuit 28 is divided by voltage-dividing resistors 9 and 13 to a lower voltage and detected. The detected voltage is applied to a control circuit 30. The control circuit 30 controls the switching device 74 for control according to the detected voltage. In other words, the switching device 74 for control is turned on in a damping period in which the damping diode 3 is on, and is turned off in a transistor period in which the switching device 2 is on. The voltage of the driving power source 8 is thus pulse-width controlled. The driving voltage output from the driving power source 8 is applied to the primary winding of the flyback transformer 5.

Since the switching device 74 for control controls the amount of electric energy accumulated in an LC resonant circuit formed of the resonant capacitor 4 and the flyback transformer 5, a quick response is given to a fluctuation of the high output voltage and a stable high output voltage is obtained. As described above, the high-voltage generating circuit 71 employs the pulse width control method to increase response for stabilizing the high voltage and the speed-up capacitor 14 of the high-voltage circuit section 29a need not have a large capacitance. Therefore, a capacitor having a capacitance of as small as about 1000 pF or less can be used for the speed-up capacitor 14 in the high-voltage circuit section 29a of the high-voltage detecting circuit 29. The speed-up capacitor 14 can be made compact and the rise time of the high output voltage can be made shorter.

Fifth Embodiment

Figure 8:
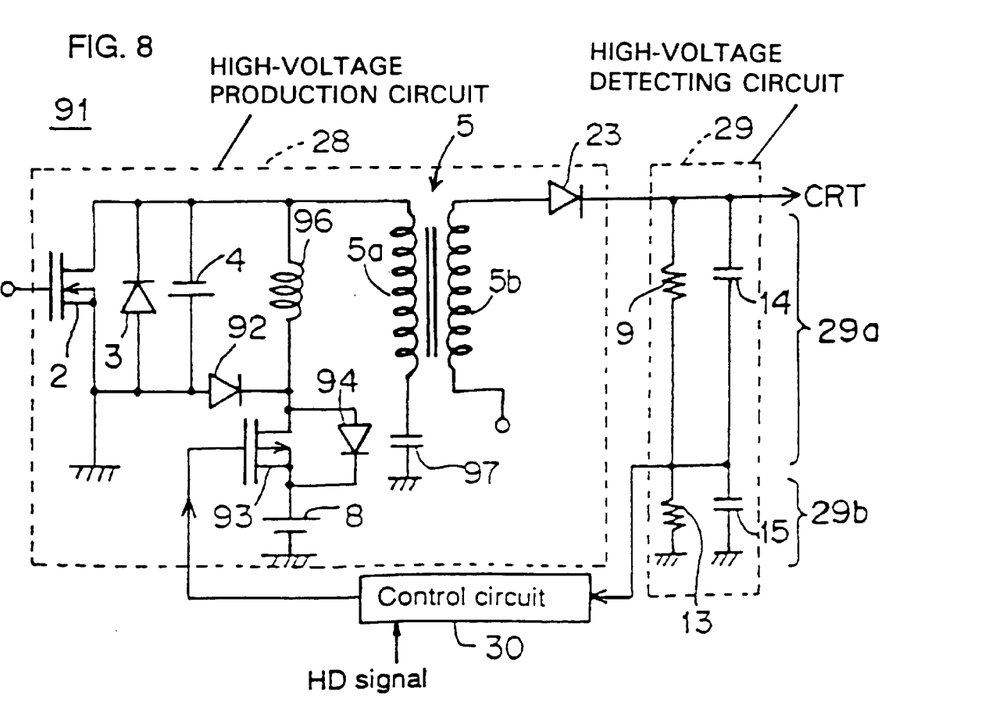
FIG. 8 is a circuit diagram of a high-voltage generating circuit according to a fifth embodiment of the present invention.

In a fifth embodiment, as shown in FIG. 8, a high-voltage generating circuit 81 employing a pulse width control method different from that described in the fourth embodiment will be described.

In a high-voltage production circuit 28, the ground end of a damping diode 3 and a resonant capacitor 4 is separated from an end of the primary coil 5a of a flyback transformer 5. One end of the primary coil 5a is connected to the ground through a capacitor 97. A choke coil 96 is connected in parallel to the resonant capacitor 4 through a rectifying diode 92. One end of the choke coil 96 is connected to the drain of a MOS FET 93 serving as a switching device for control. The source of the MOS FET 93 is connected to the ground through a driving power source 8. A damping diode 94 is connected in parallel to the MOS FET 93 with its forward direction set opposite the direction of the current flowing through the MOS FET 93.

The high voltage output from the high-voltage production circuit 28 is divided by voltage-dividing resistors 9 and 13 to a lower voltage and detected. The detected voltage is applied to a control circuit 30. The control circuit 30 controls the switching device 93 for control according to the detected voltage. In other words, the switching device 93 for control is turned on in a damping period in which the damping diode 3 is on, and is turned off in a transistor period in which the switching device 2 is on. The voltage of the driving power source 8 is thus pulse-width controlled. The driving voltage output from the driving power source 8 is applied to the primary winding of the flyback transformer 5 through the choke coil 96.

Since the switching device 93 for control controls the amount of electric energy accumulated in an LC resonant circuit formed of the resonant capacitor 4 and the flyback transformer 5, a quick response is given to a fluctuation of the high output voltage and a stable high output voltage is obtained. As described above, the high-voltage generating circuit 91 employs the pulse width control method to increase response for stabilizing the high voltage and the speed-up capacitor 14 of the high-voltage circuit section 29a need not have a large capacitance. Therefore, a capacitor having a capacitance of as small as about 1000 pF or less can be used for the speed-up capacitor 14 in the high-voltage circuit section 29a of the high-voltage detecting circuit 29. The speed-up up capacitor 14 can be made compact and the rise time of the high output voltage can be made shorter.

Sixth Embodiment

Figure 9:
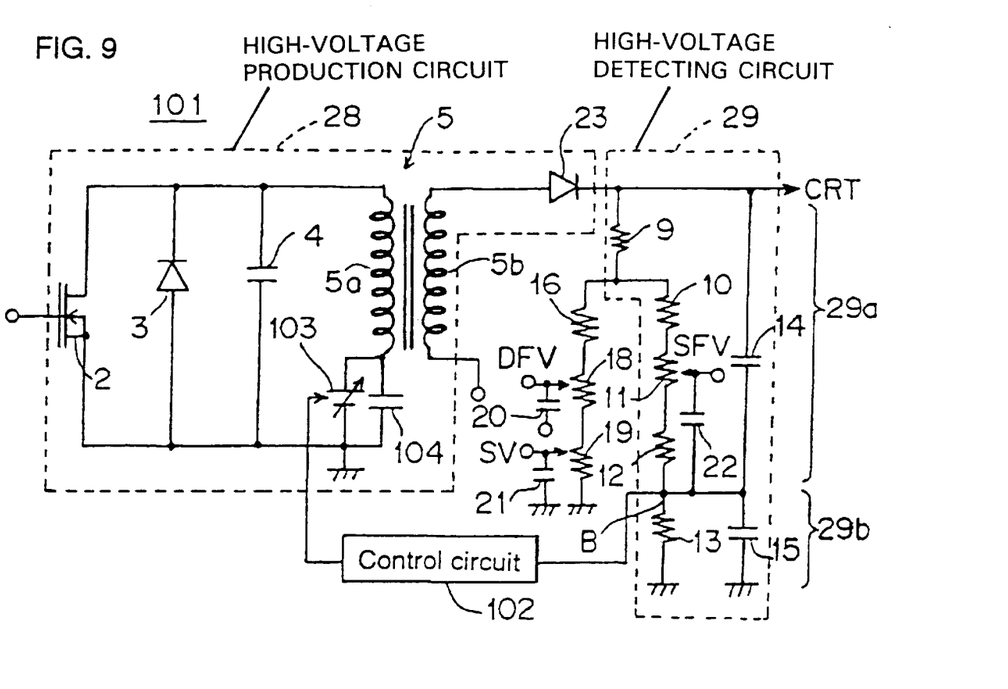
FIG. 9 is a circuit diagram of a high-voltage generating circuit according to a sixth embodiment of the present invention.

In a sixth embodiment, as shown in FIG. 9, a double-focus high-voltage generating circuit 101 will be described below. In a high-voltage production circuit 28, one end of the primary coil 5a of a flyback transformer 5 is connected to a parallel circuit formed of a variable driving power source 103 and a smoothing capacitor 104.

A high-voltage detecting circuit 29 has a high-voltage circuit section 29a formed of a parallel circuit including voltage-dividing resistors 9, 10, 11, and 12, and a speed-up capacitor 14, and a low-voltage circuit section 29b formed of a parallel circuit including a voltage-dividing resistor 13 and a speed-up capacitor 15. A high voltage output from the high-voltage production circuit 28 is divided by voltage-dividing resistors 9 to 13 connected in series to a lower voltage and detected. The detected voltage is applied to a control circuit 102. The control circuit 102 controls the variable driving power source 103 according to the detected voltage. A driving voltage output from the variable driving power source 103 is applied to the primary winding of the flyback transformer 5. The circuit of FIG. 9 is of the so called +B control type wherein the +B voltage level 103 is adjusted to regulate the high voltage level.

Since the ground point of a series circuit formed of a variable resistor 18 for dynamic focus and a variable resistor 19 for a screen is separated from the ground point of a variable resistor 10 for static focus, a current flowing through the variable resistor 10 for static focus is unlikely to leak out from the capacitor 21 for the screen, and the capacitance of the speed-up capacitor 14 can be reduced.

In addition, since one end of a capacitor 22 for static focus is electrically connected to the connection point B serving as a high-voltage detection point, a current leaking out through the capacitor 22 for static focus can be used again for high-voltage detection, and the capacitance of the speed-up capacitor 14 can be made further small. Therefore, the speed-up capacitor 14 can be made compact, and the rise time of the high output voltage can be made shorter.

A high-voltage generating circuit according to the present invention is not limited to those described in the above embodiments. It can be modified in various ways within the scope of the invention.

In the foregoing embodiments, MOS FETs are used for the switching devices 2, 74, and 93. Instead, bipolar transistors may be used. The high-voltage generating circuit may be configured such that the resonant capacitor is connected in parallel to a series circuit formed of a deflection yoke and a capacitor for correcting S-shaped distortion and all of these components are driven at the same time.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A high-voltage generating circuit comprising:
   a high-voltage production circuit for accumulating electric energy supplied from a power source in an LC resonant circuit during a transistor period and for converting the electric energy accumulated in said LC resonant circuit to a high voltage during a flyback period determined by the resonant frequency of said LC resonant circuit;
   a high-voltage detecting circuit including a high-voltage circuit section comprising a parallel circuit having a voltage-dividing resistor and a speed-up capacitor with a voltage during a flyback period determined by the resonant frequency of said LC resonant circuit;
   a high-voltage detecting circuit including a high-voltage circuit section comprising a parallel circuit having a voltage-dividing resistor and a speed-up capacitor with a capacitance of 1000 pF or less, and a low-voltage circuit section connected in series with said high-voltage circuit section and which has a parallel circuit comprising a voltage-dividing resistor and a speed-up capacitor, said high-voltage detecting circuit dividing the high voltage output from said high-voltage production circuit by the voltage-dividing resistors into a lower voltage and detecting it; and
   a control circuit for controlling said high voltage according to a voltage output from said high-voltage detecting circuit, said control circuit applying one of:
   pulse-width control to the power source voltage of said high-voltage production circuits; or
   pulse-width control to an output transistor of said high-voltage production circuit.

2. The high-voltage generating circuit of claim 1, further comprising a double-focus circuit for outputting a dynamic-focus voltage and a static-focus voltage,
   wherein a ground point of a series circuit formed of a variable resistor for dynamic focus and a variable resistor for a screen in said double-focus circuit is electrically separated from a ground point of a variable resistor for static focus in said double-focus circuit, and
   the voltage-dividing resistor in the high-voltage circuit section of said high-voltage detecting circuit comprising at least one voltage-dividing resistor serving as said variable resistor for static focus.

3. The high-voltage generating circuit of claim 1, further comprising a double-focus circuit for outputting a dynamic-focus voltage and a static-focus voltage,
   wherein a capacitor for static focus in said double-focus circuit is connected to a high-voltage detection point in said high-voltage detecting circuit.

4. The high voltage generating circuit of claim 1, wherein the pulse width control is applied to said power source voltage by controlling a switching device coupling said power source voltage to said LC resonant circuit.

5. The high-voltage generating circuit of claim 4, wherein the switching device is turned on during a damping period of oscillation of said LC resonant circuit and turned off when said output transistor is turned on.

6. The high voltage generating circuit of claim 5, wherein the switching device is coupled to the LC resonant circuit through a further inductance.

7. A high-voltage generating circuit comprising:
   a high-voltage production circuit for accumulating electric energy smoothed by a smoothing capacitor and supplied from a power source in an LC resonant circuit during a transistor period and for converting the electric energy accumulated in said LC resonant circuit to a high voltage during a flyback period determined by the resonant frequency of said LC resonant circuit;
   a high-voltage detecting circuit including a high-voltage circuit section comprising a parallel circuit having a voltage-dividing resistor and a speed-up capacitor with a capacitance of 1000 pF or less, and a low-voltage circuit section connected in series with said high-voltage circuit section and which has a parallel circuit formed of a voltage-dividing resistor and a speed-up capacitor, said high-voltage detecting circuit dividing the high voltage output from said high-voltage production circuit by the voltage-dividing resistors into a lower voltage and detecting it;
   a control circuit for controlling the voltage of the power source of said high-voltage production circuit to control said high voltage, according to the voltage output from said high-voltage detecting circuit; and
   a double-focus circuit for outputting a dynamic-focus voltage and a static-focus voltage,
   wherein a ground point of a series circuit formed of a variable resistor for dynamic focus and a variable resistor for a screen in said double-focus circuit is separated from a ground point of a variable resistor for static focus in said double-focus circuit,
   at least one voltage-dividing resistor in the high-voltage circuit section of said high-voltage detecting circuit serving as said variable resistor for static focus, and
   a capacitor for static focus in said double-focus circuit being connected to a high-voltage detection point in said high-voltage detecting circuit.

* * * * *